United States Patent [19]

Leland

[11] 4,313,211
[45] Jan. 26, 1982

[54] SINGLE SIDEBAND RECEIVER WITH PILOT-BASED FEED FORWARD CORRECTION FOR MOTION-INDUCED DISTORTION

[75] Inventor: Kenneth W. Leland, Howell, N.J.

[73] Assignee: Bell Telephone Laboratories, Incorporated, Murray Hill, N.J.

[21] Appl. No.: 65,957

[22] Filed: Aug. 13, 1979

[51] Int. Cl.³ .............................................. H04B 1/10
[52] U.S. Cl. .................................. 455/139; 455/203; 455/235; 455/304; 455/306
[58] Field of Search ...................... 455/47, 52, 65, 46, 455/70, 138, 139, 202, 203, 235, 304, 276, 306

[56] References Cited

U.S. PATENT DOCUMENTS

| 1,677,224 | 7/1928  | Affel          | 455/46  |
| 2,219,749 | 10/1940 | Oswald         | 455/203 |
| 2,219,751 | 10/1940 | Polkinghorn    | 455/138 |
| 2,907,831 | 10/1959 | De Jager et al.| 455/46  |
| 2,928,055 | 3/1960  | Weaver         | 332/45  |
| 3,104,393 | 9/1963  | Vogelman       | 455/70  |
| 3,271,681 | 9/1966  | McNair         | 455/203 |
| 3,275,940 | 9/1966  | Kahn           | 455/260 |
| 3,528,012 | 9/1970  | Kahn           | 455/139 |
| 3,634,766 | 1/1972  | Boyer          | 455/47  |

OTHER PUBLICATIONS

"An Experimental Fast Acting AGC Circuit"-A. L. Hopper, Mar. 1962, IRE Int. Conv. Record, vol. 10, Part 8, pp. 13-20.
"Direct Conversion S.S.B. Receivers: A Comparison of Possible Circuit Configurations for Speech Communication"-S. R. Al-Araji et al.-Radio and Electronic Engineer, vol. 43, No. 3, Mar. 1973, pp. 209-215.
Microwave Mobile Communications-John Wiley & Sons-Edited by W. C. Jakes, Jr., 1974, pp. 200-207, Article "Mobile Radio Systems-Modulation, Noise, and Interference-Comparison with S.S.B. and FM".
"Forward Feeding A.G.C. with Extended Signal Delays"-Rawling et al.-IERE Conference Proceedings, No. 40, Jul. 1978, pp. 85-92.
"Receiver for the Wolfson SSB/VHF Land Mobile Radio System"-Gosling et al., IERE Conference Proceedings, No. 40, Jul. 1978, pp. 169-178.
"AGC, AFC, Tone Select Circuits for Narrow Band Mobile Radio"-Lusignan-Intelcom '79, Dallas, Texas, Feb. 1979, pp. 1-4.
"The Potential of SSB for Land Mobile Radio"-Gibson et al.-29th IEEE Vehicular Technology Conference, Twenty-Ninth Annual Conf., Arlington Heights, Ill. Mar. 27-30, 1979, pp. 90-94.

*Primary Examiner*—Marc E. Bookbinder
*Attorney, Agent, or Firm*—Charles Scott Phelan

[57] ABSTRACT

Effects of multipath fading and Doppler frequency spread in a single sideband radio communication system are largely overcome by separating (17) from a received signal spectrum, a pilot frequency component including those effects and using that component to accomplish both phase (36) and gain (38) corrections on an information-containing frequency component. Signals essentially free of those effects are provided (10) for controlling necessary frequency translations in the receiver. One illustrative embodiment (FIG. 4) is conveniently arranged for facilitating diversity signal combining.

34 Claims, 4 Drawing Figures

SINGLE SIDEBAND RECEIVER WITH PILOT-BASED FEED FORWARD CORRECTION FOR MOTION-INDUCED DISTORTION

BACKGROUND OF THE INVENTION

This invention relates to single sideband radio receivers and particularly to such receivers which are useful in microwave mobile radiotelephone systems.

There are a number of ways known in the art for extracting information signals from single sideband radio signals. One way involves the use of a so-called direct conversion operation. This is shown, for example, in the paper "Direct Conversion SSB Receivers: A Comparison of Possible Circuit Configurations for Speech Communication" by S. R. Al-Araji et al. in the *Radio And Electronic Engineer*, Vol. 43, No. 3, March, 1973, pages 209 through 215. An early form of a similar circuit that is useful for either a transmitter or a receiver is shown in the D. K. Weaver Jr., U.S. Pat. No. 2,928,055. Neither Al-Araji et al. nor Weaver deals with phase or gain correction considerations.

Rapid amplitude changes are characteristic of microwave mobile radiotelephone signals working in a Rayleigh fading environment. (The microwave radio range is usually considered to be the range between approximately 450 megahertz and 20 gigahertz.) Rapid fading results from the motion of a vehicle, carrying a radio used in a communication link, through a multipath radio field. At any one point in this field, radio signals arrive by many paths and from a wide range of directions. Because of the different time delays associated with the different paths, the phases of the incoming signals appear randomly distributed over 360 degrees. When those signals add up at the radio antenna, they may add either destructively, as in the case of a fade, or constructively. As the vehicle moves, the signal phases associated with the signals traveling the different paths to the antenna change; and the sum can fluctuate dramatically. Thus, the net received signal strength tends to drop markedly in strength at approximately half wavelength intervals. Rayleigh statistics often closely approximate the degree of fading on the signal. That is, the signal envelope spends about 10 percent of the time more than 10 dB below the average envelope power level and about 1 percent of the time more than 20 dB below the average envelope power level.

Such fast amplitude changes occur too rapidly to be corrected by conventional feedback automatic gain control (AGC) systems so as to provide telephone quality audio output signals. This is because propagation delays through receiver circuits to the point at which an AGC control signal is derived are of a size which is comparable to the fade recurrence interval size so that such rapid changes cannot be corrected by feedback techniques. An even stronger expression of the dismal prospects for AGC in regard to fast deep fading in microwave mobile radiotelephone amplitude modulation and single sideband (SSB) systems is to be found in the book *Microwave Mobile Communications*, edited by W. C. Jakes, Jr., John Wiley & Sons, New York, 1974, at page 207. Nevertheless, attempts have been made, usually at frequencies below the microwave range, to effect some measure of gain control using feedback techniques. Two examples are the "Potential of SSB For Land Mobile Radio" by R. W. Gibson et al., pages 90 through 94, of *The 29th IEEE Vehicular Technology Conference Record*, March 1979, and "AGC, AFC, Tone Select Circuits for Narrow-Band Mobile Radio", by B. B. Lusignan, the latter paper having been orally presented at the February 1979 *International Telecommunications Exposition* (Intelcom 1979) Dallas, Texas (copies hand distributed).

In a somewhat different approach, a feed forward technique for AGC has been used; and one example is found in "An Experimental Fast Acting AGC Circuit" by A. L. Hopper, at pages 13 through 20, of the *IRE International Convention Record* (USA), 10, part 8, May 1962. Two other examples are "Forward Feeding AGC With Extended Signal Delays", by A. J. Rawling et al., at pages 85 through 92, of the *Institute of Electronic and Radio Engineers Conference Proceedings*, No. 40, July 1978, and "Receivers for the Wolfson SSB/VHF Land Mobile Radio System" by W. Gosling et al. at pages 169–178 of the same Conference Proceedings. In all of these cases, however, the correction reference signal is derived in a way that does not cleanly separate the amplitude reference. Thus, none of these gain control techniques produces a signal which is of telephone quality in the microwave mobile radio region where problems of deep rapid fade are particularly severe.

The same multipath environment that produces the rapid fading also causes rapid extraneous phase fluctuations to be introduced in the received signal. The rapid phase and amplitude fluctuations introduced due to vehicle motion have the effect of spreading a single frequency tone into a band of frequencies with a bandwidth equal to twice the maximum Doppler frequency based on the vehicle speed. For example, a 160 hertz bandwidth is applicable for a vehicle speed of 60 miles per hour and a radio frequency of approximately 900 megahertz. The random phase or frequency variations are often referred to as "random FM." Alternatively, one can think of a number of signal components traveling different paths and coming in at different angles to the vehicle's direction of motion and, therefore, having different Doppler shifts. These signals then add up to occupy a band of frequencies. A further treatment of fading in the multipath environment can be found in "Advanced Mobile Phone Service: Voice and Data Transmission" by G. A. Arredondo et al. at pages 98–103 of the January 1979 *Bell System Technical Journal*. Regardless of the way of describing their cause, these phase fluctuations on the received signal alone are sufficient to produce substantial distortion in the recovered audio or other information signal which cannot be corrected by the usual feedback automatic frequency control (AFC) loops which are subject to circuit propagation delay effects as already mentioned in regard to AGC.

Some examples of systems for frequency control include the U.S. Pat. Nos. 3,275,940 of L. R. Kahn, 3,271,681 of R. J. McNair, and 3,634,766 of M. L. Boyer. In these patents, a received single sideband signal is translated down in frequency prior to separating a pilot component from the information component, and then the pilot signal is fed back to adjust a local oscillator frequency. Another example of a feedback frequency control system is found in the aforementioned Lusignan paper.

The prior art single sideband mobile radio experiments have generally worked at frequencies no higher than the lower edge of the microwave frequency range, i.e., the range between approximately 450 megahertz and 20 gigahertz. Consequently, they have not faced the more severe problems of rapid deep fading and fast Doppler related frequency variations that characterize the multipath environment of land mobile radio in the microwave frequency range.

SUMMARY OF THE INVENTION

The effects of the foregoing problems are reduced in an illustrative embodiment of the present invention in which a pilot signal component is separated from a received radio signal both of which include fading and phase distortion effects. That component is utilized for effecting feed forward gain correction of at least an information component of the received signal.

In one embodiment the separated pilot component is also used for correction for phase distortion. The indicated receiving technique is also applied to incur the benefits of space diversity reception.

BRIEF DESCRIPTION OF THE DRAWING

A more complete understanding of the invention and the various features, objects, and advantages thereof may be obtained in the consideration of the following detailed description in connection with the appended claims and the attached drawings in which:

DETAILED DESCRIPTION

Figure 1:
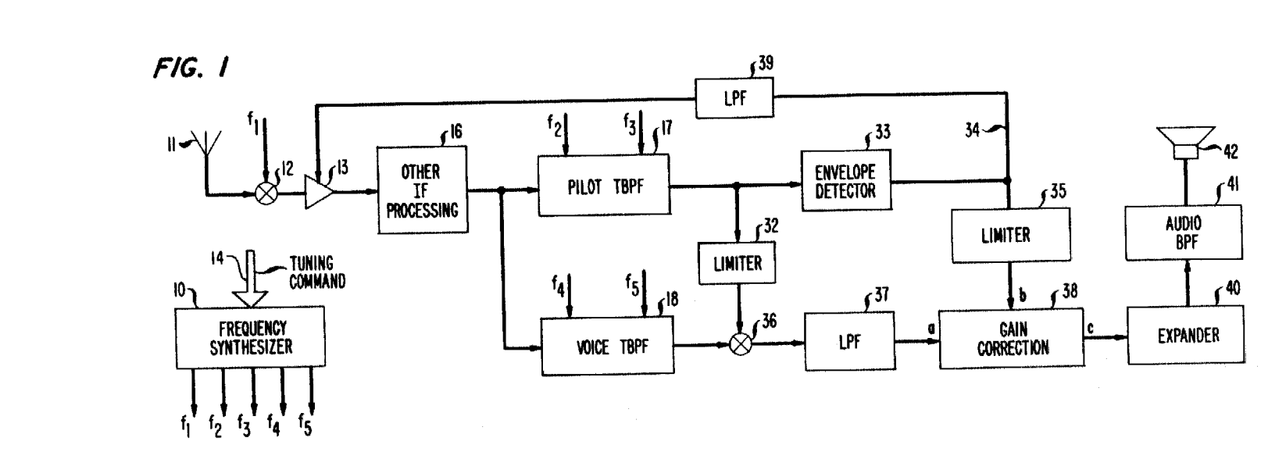
FIG. 1 is a block and line diagram of a single sideband receiver according to the present invention.

In FIG. 1 a frequency synthesizer 10 supplies various signals of different frequencies which are used to control frequency translation and filtering functions in other parts of the single sideband receiver of FIG. 1. These signals are of stable frequency and the phase is independent of the phase of signals received at an antenna 11. Various forms of suitable synthesizer circuits are known in the art, and one suitable form is that described at pages 524 et seq. in "Frequency synthesizers: theory and design" by V. W. Manassewitsch, Wiley Interscience, 1976. Illustrative output leads of the synthesizer 10 are designated by the subscripted reference character f to represent the different frequencies. Similar reference characters are applied to other leads in the receiver where the respective synthesizer output signals are applied. In a fixed radio station usage, the frequency synthesizer 10 generally has fixed outputs for a particular voice channel transceiver. However, if the synthesizer is utilized in a tracking receiver of a fixed station, or in a transceiver of a mobile radio unit, the synthesizer receives tuning commands by way of data circuits 14 from an appropriate data signal source (not separately shown), various forms of which are known in the art and which comprises no part of the present invention. The receiver of the present invention is hereinafter described, without limitation, as a receiver that is utilized in a mobile radio unit because that is generally the most difficult case to deal with. Various techniques are known in the art for communicating data between mobile and fixed stations and include, e.g., an in-channel but out-of-voice band data channel or a blank and burst communication in the voice band or a separate data channel outside the desired channel. Thus, these techniques comprise no part of the present invention.

Radio signals are received at an antenna 11 and include signals for multiple communication channels, each including in SSB suppressed carrier form at least an information frequency component, e.g., voice or data signals, and a pilot frequency component in some predetermined spectral position in relation to the band of the information component. For example, to facilitate discussion of an illustrative embodiment there will be hereinafter assumed a communication channel that is 5 kilohertz in width. A pilot signal is located at 200 hertz above the low frequency edge of the channel, and voice signals are located in a band extending from 800 hertz to 3500 hertz above the low frequency edge of the channel corresponding to the audio frequencies of 300 to 3000 hertz translated to RF. If the receiver is utilized in a radiotelephone, high capacity, cellular, channel-reuse system, at least one channel is advantageously dedicated for call setup purposes; and the information component of the channel signal contains various types of data signals utilized for the call setup purposes. Radio signal transmitting equipment for providing appropriate channel information and pilot components of the types hereinbefore outlined, and assuming use of amplitude compression, are known in the art and comprise no part of the present invention.

In land mobile radiotelephone systems, especially those operating in the microwave frequency range, the received radio signals include both rapid deep fading, which is typical of Rayleigh fading in the multipath environment, and rapidly varying frequencies which are typical of the Doppler frequency spread effect in the mobile multipath environment. The rapid fading and frequency spread effects have been previously described.

Signals received at the antenna 11 are translated to an intermediate frequency (IF) range in a mixer such as the balanced mixer 12 in FIG. 1. The ZAD-4 mixer described starting at page 32 of "RF Signal Processing Components" of Mini-Circuits, Inc., 1978–79, is suitable for the purpose. Mixer 12 also receives the signal $f_1$ from the frequency synthesizer 10. In a microwave mobile radio system utilizing communication channels in the portion of the frequency spectrum above 800 megahertz, the signal $f_1$ has a frequency which is selected, for the particular channel to be processed in the receiver, to translate that channel to a nominal IF of about 10 megahertz. That translated IF signal still includes the aforementioned fading and frequency spread distortion effects. The output of mixer 12 is applied to an amplifier 13 where it is subjected to typical slow AGC feedback correction for the usual slow gain effects such as are caused by changing mobile unit distance from a station, shadowing with respect to a transmitting station, and the like. The output of amplifier 13 is then coupled through miscellaneous other IF signal processing circuits well known in the art, e.g., for band limiting of the IF signal to a band including primarily the desired channel but also including at least a part of the channels on either side in the spectrum. Such processing circuits are schematically represented by the circuit 16 in the drawing.

IF signals from the processing circuit 16 are then applied in parallel to two translating bandpass filters (TBPF) 17 and 18. These filters are advantageously direct conversion circuits of a type sometimes characterized as a Weaver circuit. These circuits translate a signal between different frequency levels and/or effect bandpass filtering at the same time. Such circuits are shown in the aforementioned Weaver patent and in the Al-Araji et al. paper. However, for reader convenience a generalized block and line diagram of such a circuit is shown in FIG. 2 and will be briefly described herein.

Figure 2:
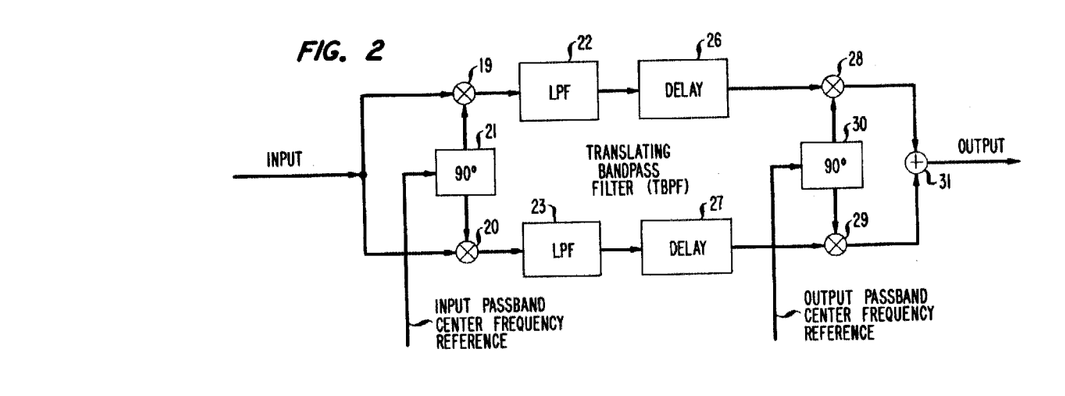
FIG. 2 is a block and line diagram of a translating bandpass filter of a type which is useful in the receiver of FIG. 1.

In FIG. 2 input signals to the illustrated translating bandpass filter are split into parallel branches for processing in each branch. A first mixing stage includes balanced mixers 19 and 20 in the respective branches for translating input signals to a frequency level which is convenient for filtering or other purposes. Mixers 19 and 20 and other mixers used herein for IF or baseband signals are advantageously the MC1596 mixer described beginning at pages 8–416 in "Linear Integrated Circuits Data Book" of the Motorola Co., 1973. The reference frequency used for the first mixing operation is advantageously selected to be the input passband center frequency of the input signals so that the input midband frequency of the desired band is in the outputs of the mentioned mixers substantially at zero frequency. Such outputs therefore have a direct current component having a magnitude which corresponds to the magnitude of the center frequency component for the input signals to the FIG. 2 circuit.

The mixing reference frequency signal is coupled through a phase shifting circuit 21 wherein respective inphase and quadrature phase versions of the reference signal are produced for application to the mixers 19 and 20, respectively. In the drawing the phase shifting circuit 21 is schematically represented as a 90-degree phase shifting box. However, in one advantageous schematic arrangement the box actually comprises two all-pass phase shifting circuits that develop outputs which differ in phase by 90 degrees.

Essentially identical low pass filters 22 and 23 are included in the respective branches of the FIG. 2 circuit and have the same cut-off frequency. That frequency is equal to half the width of the desired band of frequencies at the TBPF input which are to be selected. Since these filters are working at baseband it is relatively easy to perform any delay equalization that may be necessary across that band of interest as compared, e.g., to equalizing a bandpass filter for a similar band at IF. Outputs of filters 22 and 23 are coupled through respective delay circuits 26 and 27 to inputs of respective balanced mixers 28 and 29. These delays are included in equal amounts only to the extent that delay may be needed for a particular filter application as will be subsequently described herein, e.g., with respect to the circuit of FIG. 1. It has been found that it is often easier to accomplish the desired delay at the frequency of the output of the low pass filters than it is to try to effect the same delay result in another circuit, e.g., following the FIG. 2 circuit when signals at those frequencies are at a much higher frequency level in the spectrum. For example, this is a convenient way to effect delay in a particular frequency component which is to be subsequently used in a signal processing operation wherein the component is at an arbitrary frequency level in the spectrum.

The second mixing stage in the FIG. 2 circuit translates the selected low frequency band to a desired frequency level position using in-phase and quadrature phase versions of an output passband center frequency reference produced in a phase shifting circuit 30 which functions in the same manner as the circuit 21 hereinbefore described. Respective outputs of mixers 28 and 29 are combined in an analog adding circuit 31 to produce the desired frequency band of signals at a desired location in the frequency spectrum centered about the output passband center frequency reference. Thus, when "translating bandpass filter" or "TBPF" is used herein, it refers to the FIG. 2 type of circuit using control, or reference, frequencies which are independent in phase with respect to the FIG. 2 input and output signal phases.

Returning to consideration of the receiver of FIG. 1, the pilot TBPF 17 is operated to select from the received intermediate frequency band the pilot signal component for a predetermined information communication channel with all of the fading and frequency spreading effects to which that channel had been subjected in transmission to the antenna 11. In the course of this selection process, the TBPF 17 is also employed to translate those frequency spreading effects to be approximately centered on a predetermined frequency carrier. Thus, assuming for purposes of illustration that input intermediate frequencies from the processing circuit 16 have a channel low frequency edge of 10 megahertz, the TBPF 17 employs an input passband center frequency reference $f_2$, otherwise sometimes called the pilot frequency reference, of 10.000200 megahertz. This operation causes the outputs of the filters 22 and 23 of the TBPF 17, having cut-off frequencies of approximately 100 hertz, to include the Doppler frequency spread spectrum associated with the 10.000200 megahertz intermediate frequency version of the pilot.

Pilot TBPF 17 also uses an output passband center frequency reference $f_3$, sometimes called the voice suppressed carrier frequency reference, at a frequency of 10.000500 megahertz, to translate the pilot frequency from 200 to 500 hertz above the lower edge of the aforementioned 5 kilohertz channel. That is, the pilot frequency information in the direct current component of the TBPF low-pass filter output is translated to the indicated 500 hertz position. The output of TBPF 17 then includes the Doppler spread frequency band at plus or minus 80 hertz with respect to that frequency $f_3$. Thus, the output of TBPF 17 illustratively includes substantially only frequencies in the range of 10.000400 megahertz through 10.000600 megahertz. This output of course still includes all of the slow and fast fading effects associated with signals received at the antenna 11. The output of TBPF 17 is applied in parallel to the input of a limiter circuit 32 to derive the frequency spreading phase corruption information without the fading corruption information and to the input of an envelope detector circuit 33 that derives the fast and slow fading corruption information without the frequency spread phase corruption information.

Since deep fades are involved in signals transmitted in the microwave multipath radio environment, it is necessary, when correcting for phase distortion, to eliminate such fading information from the correction reference signal. This is due to the multiplicative method (mixing) by which phase correction will be applied and which would further disrupt the signal gain if the phase correction signal were fading. Although it is recognized that certain mixers provide partial limiting on one of their two inputs as a natural consequence of implementation, the removal of amplitude information is advantageously accomplished here in the limiter circuit 32. In that circuit extensive amplification of the signal is followed by clipping thereof at a level which is below the deepest anticipated fade as amplified. This type of operation preserves the zero amplitude axis crossing information including the phase corruption information which is of interest. One specific way to achieve that result without producing instability in the receiver is to utilize two phase locked loops in cascade and arrange each to track the frequency variation around 10.000500 megahertz. One example of a phase locked loop which is suitable in the illustrative frequency range for this operation in the environment of frequent rapid swings through the full Doppler spread spectrum is the Signetics NE561 phase locked loop integrated circuit chip. These circuits perform the necessary phase tracking operation with minimal additional delay of output signals from filter 17. The signals so configured are applied as the reference frequency input to a balanced mixer 36 which also receives the output of the voice TBPF 18.

The voice TBPF 18 is of the same type hereinbefore described with reference to FIG. 2. It utilizes an input passband center frequency reference $f_4$, otherwise sometimes designated the voice channel center frequency reference, for a particular communication channel information component illustratively centered at 10.002150 megahertz. The assumed voice band of interest in the aforementioned illustrative 5 kilohertz channel lies between 800 and 3500 hertz, which appears at the channel IF between the frequencies 10.000800 megahertz and 10.003500 which are centered on the aforementioned voice channel center frequency reference. Consequently, in this voice TBPF 18 the low pass filters 22 and 23 have their cut-off frequency at 1450 hertz; 1350 plus the 100 hertz allowance for Doppler spread. In this particular illustrative embodiment the output passband center frequency reference $f_5$ is at the same frequency as the input reference $f_4$ since the TBPF 18 is here utilized as a convenient and easily controllable filtering device for selecting the predetermined voice channel from other frequencies which may appear in the output of the processing circuit 16 and in particular separating the voice frequency spectrum of the channel from any adjacent pilot frequency and other channel pilots and voice signals to the extent that previous IF filtering is incomplete. The convenience of controllability is of some importance since it is often advantageous to utilize a particular receiver circuit in different applications in a system. The TBPF circuits 17 and 18 characteristically provide sharp filtering at least equivalent to that available with complex and expensive crystal filters, but the operating frequencies and passband of the TBPF are conveniently selectable merely by providing appropriate tuning commands to the frequency synthesizer which provides the TBPF control reference frequencies. Similarly, the pass bandwidth is conveniently selectable by switching inexpensive baseband low-pass filters.

The delays 26 and 27 were not utilized in the pilot TBPF 17, but they are utilized in the TBPF 18 to match its delay with respect to that through the TBPF 17 and limiter 32. In one embodiment that delay was set at approximately 32 milliseconds for each of the delays 26 and 27 in the TBPF 18. This delay reflects primarily the fact that the 100 hertz cut-off frequency in the illustrative pilot TBPF 17 low-pass filters was associated with a sharper filter roll off characteristic (hence a correspondingly longer delay) than the 1450 hertz cut-off frequency in the low-pass filters of the voice TBPF 18. The output of TBPF 18 includes essentially only the aforementioned voice frequency band at the 10 megahertz IF level including the fading and Doppler frequency spread distortions that were present in signals received at antenna 11.

Mixer 36 combines pilot and voice signals, both at the IF level. Since both have undergone the same Doppler frequency spreading; and since the pilot signal and the voice signal are close in frequency at the radio frequency (RF) level, there is insignificant delay dispersion between those components. Therefore, the mixing operation translates the voice band signals to the baseband audio frequency level by the frequency subtraction inherent in mixing and in the process cancels out any like frequency deviations such as those due to the rapid Doppler frequency spreading. Thus, the phase correction of the voice information component for the Doppler effects is complete. The output of mixer 36 is coupled through a low-pass filter 37 to an input a of a fast fade, gain correction circuit 38. Filter 37 is an RF blocking filter and so has a cut-off frequency selectd at any convenient frequency between the IF and the audio so that it passes only the lower sidebands, i.e., essentially only the baseband frequencies of the mixer 36 output.

It was previously mentioned that the output of the envelope detector 33 is utilized for gain control purposes. It can be shown that when envelope detection, or similar operations, are performed in a rapidly fading signal environment frequency spreading takes place to both higher and lower frequencies. If the detection is performed with respect to a band including, e.g., both pilot and voice bands that are close in frequency, each component is partially spread into the band of the other. However, in FIG. 1 envelope detector 33 operates with respect to only the narrow pilot band in the output of TBPF 17, which band includes no significant information, i.e., voice band frequencies. Thus, there is no significant voice energy present to be smeared by the detector into the pilot band and thus corrupt the latter gain correction process using the pilot band signal. Similarly, the pilot band frequency-smeared energy let out is all available for use in the gain correction process rather than being partially suppressed by a subsequent pilot-separating filtering as in the prior art.

The derived envelope of the pilot is an indicator of the Rayleigh fast fading effect and various slow fading effects. The output of detector 33 is coupled through a low-pass filter 39 to the amplifier 13 for use in the usual manner for automatic gain control (AGC) to correct for slow amplitude changes. For this purpose the filter 39 has a cut-off frequency of about 5 hertz. That slow AGC advantageously has the effect of setting the average value of the output of detector 33 at approximately one volt. The same output of detector 33 is also applied through a limiter 35 as a second input b signal to the gain correction circuit 38 to correct for undesired fast amplitude changes. Limiter 35 is set to limit negativegoing signal excursions to a value equal to the product of a predetermined constant, advantageously 0.1, times that envelope average value for a reason to be discussed.

In the circuit 38 the phase corrected voice information signals are advantageously divided by a factor including the limited envelope detector output. That factor signal advantageously has substantially the same delay as the delay in the signals which are coupled through the mixer 36 to the first input of the gain correction circuit 38. The low-pass filter 37 is simply an RF block and has negligible delay effects at baseband. The analog division in the circuit 38 of the two input signals supplied thereto, with the same fast fading effects being time aligned with one another because of the aforementioned delay matching, accomplishes a cancellation of those flat fading effects. The aforementioned factor signal, i.e., limiter 35 output, which is applied to the b input of the gain correction circuit 38 is advantageously the larger of a value, which is equal to the aforementioned negativegoing limiter value, i.e., 0.1 times 1 volt, or a value which is the instantaneous value of the envelope detector output. Accomplishing the division in this fashion prevents the divisor b from going close to zero when the instantaneous value of the detector 33 output goes close to zero (as sometimes happens in deep Rayleigh fading environments). Absent the term e, such an event would cause the correction circuit gain to become extremely large. If the audio, and hence the pilot envelope, value had faded somewhat less than e due to decorrelating affects such as frequency selective fading, it would introduce annoying bursts of excessive signal in the receiver audio output, even after the usual audio band limiting filtering. Even in the theoretical absence of the slight decorrelation between voice and pilot fading envelopes, the e limit is necessary to limit the burst effect on noise and interference during fades. Many illustrative circuit arrangements are commercially available for implementing the gain correction circuit 38. One of these is the analog division circuit illustrated in FIG. 25 at page 8-411 of the Motorola "Linear Integrated Circuits Data Book", 3rd edition, November 1973. This circuit includes basically an analog multiplier, as represented, for example, by the Motorola integrated circuit chip MC15951, connected to receive the aforementioned a and b inputs to the gain correction circuit 38 and having its output connected to the input of an operational amplifier, such as the Motorola integrated circuit amplifier chip MC1741G. That amplifier output would then be the c output of the gain correction circuit 38 indicated in the drawing. Additional connections are provided as in that FIG. 25 to complete the division circuit.

The c output of the gain control circuit 38 is coupled through an expander 40 such as, for example, the expander in the R. Toumani, U.S. Pat. No. 3,919,654, and an audio bandpass filter 41, to a transducer such as a loudspeaker 42. Bandpass filter 41 takes the 300 hertz through 3000 hertz voice band and blocks out residual pilot frequency components adjacent to that band as well as any other adjacent distortion product frequencies that may have appeared as a result of the various processing operations noted in the receiver of FIG. 1.

The employment of translating bandpass filters in the FIG. 1 single sideband receiver allows relatively easy matching of delay through the pilot and voice branches of the receiver prior to the points at which phase and gain corrections are made even though those translating bandpass filters do signal component selections before the aforementioned corrections are accomplished. The necessary equalization of the filter delay at all passband frequencies is also facilitated for both the pilot and voice filters. In the absence of the TBPF circuits for separating the signals of the two branches before correction, conventional SSB filter method circuits must work under necessarily severe delay equalization requirements due to filtering at the considerably higher IF frequency. In addition, there is substantially no risk in the circuit of FIG. 1 of spreading of adjacent-channel independent fading signal variations into the desired channel by the correction process because the correction is applied after the voice band selective filtering. If correction were applied before the voice channel selective filtering, say at RF or IF as in prior art feedback correction systems, the correction signal would be applied to the independently fading adjacent channels as well as the desired channel. This would spread the spectrum of the adjacent channels to the extent that some of the energy from those channels would overlap into the desired channel. The extent of this effect depends on the vehicle speed, the extent of correction, and the RF frequency of operation; and the effect becomes worse with increasing values of any of those elements.

Figure 3:
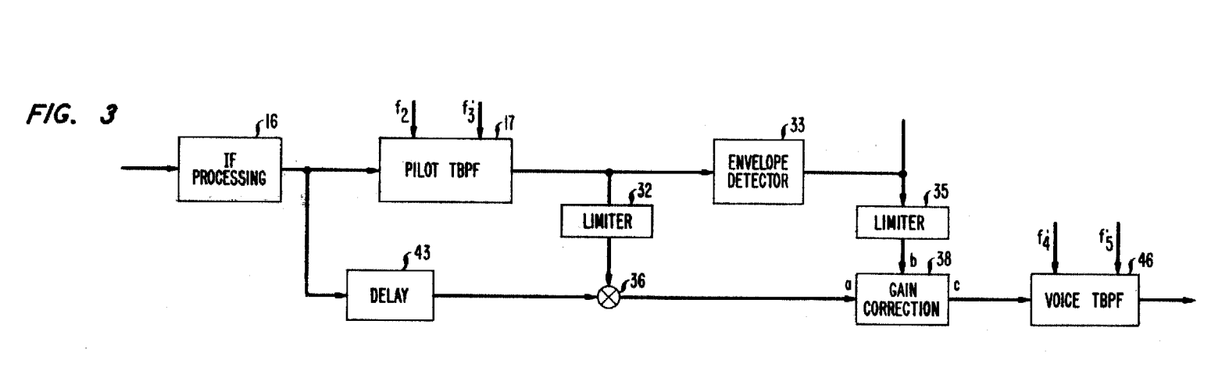
FIG. 3 is a block and line diagram of a modified form of a part of the receiver of FIG. 1.

FIG. 3 depicts a modification of a part of the circuit of FIG. 1. The same or similar reference characters are used to indicate elements in the two circuits which correspond to one another. Here correction is carried out before voice channel selection filtering, and the adjacent channel spreading effects previously described are present but tolerable in some system applications even though voice quality is not as good as is the case for the circuit of FIG. 1. The circuit of FIG. 3 relaxes substantially the delay equalization constraints on the voice TBPF because the filter is past the points of phase and gain correction.

In FIG. 3 the pilot signal component of signals received from the processing circuit 16 is derived from those signals and utilized in the mixer 36 and the gain control circuit 38 in much of the same fashion already outlined for FIG. 1. A different output reference frequency $f'_3$ of 7.000500 megahertz is provided from the frequency synthesizer 10. Thus, the output of the pilot TBPF 17 is at 7.000500 megahertz with the associated fading and frequency corruptions already described in connection with FIG. 1. The different value of $f'_3$ is used so that mixer 36 output will be at a second IF rather than baseband because voice channel selection has not taken place and so the sidebands must be kept separate.

In the voice branch of the FIG. 3 circuit, a broadband delay circuit 43 couples the IF band signals from processing circuit 16 to an input of the mixer 36 without prior IF voice band signal component separation. The amount of delay required is equal to the delay in the TBPF 17 and limiter 32. It is within the skill of the art to provide such a broadband delay circuit that equally effects without significant dispersion the disparate frequency components of the IF signal band applied to the delay circuit 43.

Mixer 36 receives at its two inputs on the one hand the translated pilot component plus phase distortions occurring about a center frequency of 7.000500 megahertz, while on the other hand the mixer also receives at its other input the entire first IF band including the desired and neighboring channels all with extraneous amplitude and phase effects imposed that may be independent from channel to channel. Thus, the desired voice channel component at the output of mixer 36 is cleared of the common phase distortion on its frequency components but still includes the fading distortions on the pilot and voice modulation as they appear at the second IF difference frequency of 3.0 megahertz. The output of mixer 36 includes the desired difference frequency product of the desired channel. In addition to the unused sum frequency produce of the desired channel, there are also adjacent channel sum and difference frequency products that are "corrected" with the unrelated pilot of the desired channel. The total mixer output about 3.0 megahertz is applied to the a input of the gain correction circuit 38, and in that circuit the interaction with the pilot component envelope detector 33 output eliminates the fast fading distortion as previously described. The desired voice component at the second IF frequency band is now fully phase and gain corrected and is applied to a new voice TBPF 46. A conventional SSB detector and crystal filter, i.e., according to the filter method of SSB demodulation, could be used also. Again, the "correction" applied to the adjacent channels is inappropriate, but they will be substantially removed by the TBPF 46.

The TBPF 46 is of the same type previously described in connection with FIG. 2, but no delay circuits 26 and 27 are included because matching of the pilot and voice component paths was done in the delay 43. Otherwise, the TBPF 46 accomplishes the channel selection and voice band translation to the baseband level of the frequency spectrum using the control frequencies $f'_4$ and $f'_5$ obtained from the frequency synthesizer 10. That frequency $f'_4$ is at 3.001650 megahertz, i.e., the center of the voice band at the second IF for the desired channel. That band at IF extends from 3.000300 megahertz to 3.003000 megahertz assuming that the voice band is 2700 hertz wide and centered on the frequency $f4'$. In this arrangement the low-pass filters 22 and 23 of the TBPF 46 have a cut-off frequency at 1350 hertz. The output passband center frequency reference $f'_5$ is at 1650 hertz. Thus, TBPF 46 output comprises the voice band which extends between 300 hertz and 3000 hertz. The TBPF type of filter used in FIGS. 1 and 3 simplifies the selection of information component and pilot component at different possible positions within the channel, since the reference frequencies that control the TBPF are advantageously supplied by a data command responsive frequency synthesizer 10, in order to change either the filter center frequency or the output band center frequency.

The output of the voice TBPF 46 is applied to the expander 40 as before. However, in this case no low-pass filter, corresponding to the filter 37 of FIG. 1, is required because the band limiting function is achieved within the TBPF 46 along with the other signal selection and frequency translation functions automatically performed thereby.

Figure 4:
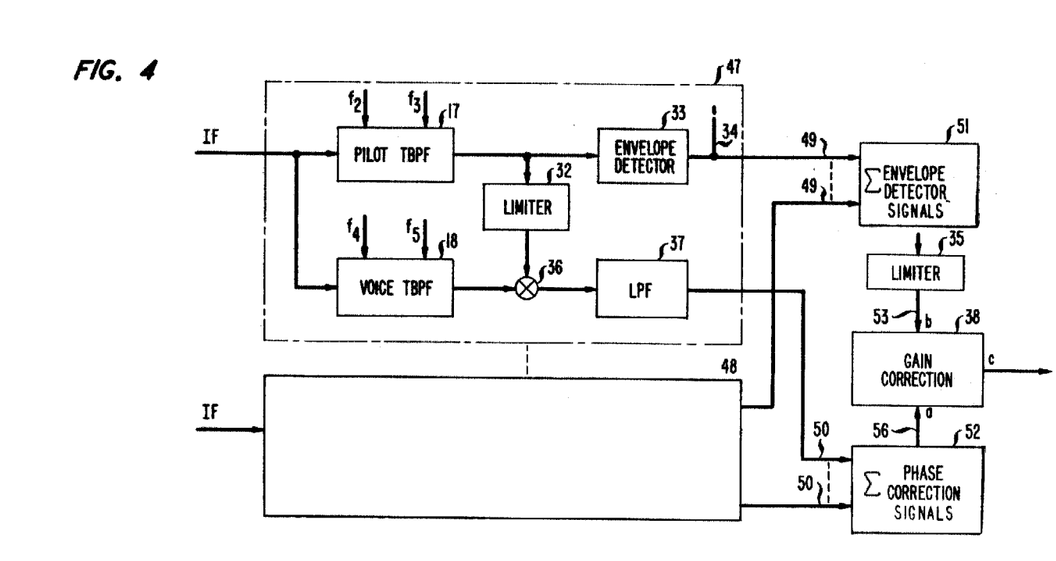
FIG. 4 is a block and line diagram of a diversity combining receiver utilizing the present invention.

FIG. 4 is a diversity reception embodiment of the invention. Diversity radio signal reception is often employed in mobile radio telephone systems, and the embodiment of FIG. 1 is particularly advantageous for that purpose because it permits plural signals to be combined to reduce the severity of fading while properly maintaining the necessary phase and gain correction. The phase and gain correction diversity method works by first phase correcting the voice signal of each branch by the pilot of the same branch so that the branches can be added coherently at baseband. This is analogous to cophasing in existing FM mobile diversity systems. Each branch must be phase corrected by its own pilot signal since the random phase of each branch is essentially independent of the remaining branches. Summation of the branches must occur before amplitude correction to reduce deep fades and hence improve performance over a no diversity receiver as explained in a subsequent paragraph.

Plural phase correction circuit modules, such as the two modules 47 and 48 which are specifically indicated in FIG. 4, are provided. Each is part of a separate receiver which is coupled to a separate antenna and thus has its own separate version of the intermediate frequency signal band applied from its own intermediate frequency processing circuit 16. Each of the modules is the same and includes the circuits of FIG. 1 for producing the pilot component envelope detector 33 output signal as well as the phase corrected voice band component output signal of lowpass filter 37 as indicated by circuits 49 and 50, respectively, on the respective output of the modules 47 and 48.

Envelope detector outputs on the respective circuits 49 are combined in an analog summing circuit 51. One example of an implementation for such a circuit is the MC1741G integrated summing circuit chip of the Motorola Corporation. The output of the summing circuit 51 is coupled through limiter 35 and on a lead 53 to the b input to the gain correction circuit 38. Similarly, the phase correction mixer 36 output circuits 50 of the various modules are combined in another similar summing circuit 52, the output of which comprises the a input to the gain correction circuit 38. That circuit now operates on the combined input signals as though they were single respective inputs and eliminates the common fast fading distortion components that are in both combined inputs. Since fading appearing in each branch of the diversity receiver is highly independent of fading in the remaining branches, the probability of a deep fade occurring in the sum of the branch signals is much lower than the probability of a like fade in any one branch or in the nodiversity receiver of FIG. 1. The frequency of occurrence and amplitudes of the bursts of noise and interference associated with deep fades are thereby reduced. The value of e used for the gain correction circuit 38 in FIG. 4 is not critical, and so it is advantageously the same for the embodiment of FIG. 4. as for the single-branch embodiment of FIG. 1. An output c of the gain correction circuit 38 is then applied to the input of the expander 40 in FIG. 1.

It can be seen that the embodiment of FIG. 3 also lends itself to utilization in the FIG. 4 diversity system. In that case the single gain correction circuit 38 is responsive to the sum of voice components at the second IF instead of at baseband as now shown in FIG. 4. Likewise, the output of circuit 38 is coupled through the TBPF circuit 46 to expander 40.

In some applications where reduced audio quality is acceptable, the diversity system of FIG. 4 is advantageously simplified by eliminating leads 49, detector 51, limiter 35, and correction circuit 38. Lead 56 is then coupled to expander 40. The quality reduction is advantageously mitigated by making such coupling through one of the well-known forms of AGC where control is derived from the audio envelope by distinguishing fading frequencies from speech frequencies.

Although the present invention has been described in connection with particular applications and embodiments thereof, it is to be understood that additional embodiments, modifications, and application of the invention which will be obvious to those skilled in the art, are included within the spirit and scope of the invention.

I claim:

1. In a single sideband radio receiver for radio signals including phase and fading distortion effects, the signals including at least an information component and a pilot component, both components having said distortion effects therein as received, the improvement comprising
    means (17) for separating said pilot signal component from the received radio signals, means (38), responsive to the pilot component, for effecting forward gain correction of the information component of the received signals, and means (35) for establishing for said pilot signal component from said separating means a predetermined, nonzero, minimum, envelope value to prevent excessive bursts of gain-corrected information component during deep received signal fades.

2. In a single sideband radio receiver for radio signals including phase and fading distortion effects, the signals including at least an information component and a pilot component, the improvement comprising means (17) for separating said pilot signal component from the received radio signals, said separating means including means (19–23) for extracting from said received signals a portion of the frequency spectrum thereof including a baseband portion representing said phase and gain distortion effects with respect to said pilot component, and means (28, 29) for translating said baseband portion to a predetermined nonbaseband level in the frequency spectrum, and means (38), responsive to an output of said translating means, for effecting forward gain correction of the information component of the received signals.

3. In a single sideband radio receiver for radio signals including phase and Rayleigh fading distortion effects, the signals including at least an information component and a pilot component, the improvement comprising means (17) for separating said pilot signal component from the received radio signals, said separating means including a translating bandpass filter, and means (38), responsive to the pilot component, for effecting forward gain correction of at least said Rayleigh fading effects in the information component of the received signals.

4. In a single sideband radio receiver for radio signals including phase and Rayleigh fading distortion effects, the signals including at least an information component and a pilot component, the improvement comprising means (17) for separating said pilot signal component from the received radio signals, means for separating said information component from said received signals by a translating bandpass filter, and means (38), responsive to the pilot component, for effecting forward gain correction of at least said Rayleigh fading effects in the information component of the received signals.

5. In a single sideband radio receiver for radio signals including phase and fading distortion effects, the signals including at least an information component and a pilot component, the improvement comprising means (17) for separating said pilot signal component from the received radio signals, said separating means including a translating bandpass filter, means (38), responsive to the pilot component, for effecting forward gain correction of the information component of the received signals, and means (10), independent of received signal phase, for supplying predetermined control frequency signals to control said translating bandpass filter.

6. The receiver in accordance with claim 5 in which means (18) are provided for separating said information component from said received signals by a translating bandpass filter, and means are provided for coupling said supplying means to apply predetermined control frequency signals to control said information component translating bandpass filter.

7. In a single sideband radio receiver for radio signals including phase and fading distortion effects, the signals including at least an information component and a pilot component, the improvement comprising means (17) for separating said pilot signal component from the received radio signals, said separating means including a translating bandpass filter, means (18) for separating said information component from said received signals by a translating bandpass filter, means (10), independent of received signal phase, for supplying signals of predetermined frequency to control said translating bandpass filters, and means (38), responsive to the pilot component, for effecting forward gain correction of the information component of the received signals.

8. In a single sideband radio receiver for radio signals including phase and fading distortion effects, the signals including at least an information component and a pilot component, the improvement comprising means (17) for separating said pilot signal component from the received radio signals, said separating means including a translating bandpass filter, means (18) for separating said information component from said received signals by a translating bandpass filter, means (38), responsive to the pilot component, for effecting forward gain correction of the information component of the received signals, and means (26, 27) in said translating bandpass filter for said information component for matching signal propagation delays for said pilot component and said information component prior to application of said such components to said gain correcting means.

9. In a single sideband radio receiver for radio signals including phase and fading distortion effects, the signals including at least an information component and a pilot component, the improvement comprising means (17) for separating said pilot signal component from the received radio signals, said separating means including a translating bandpass filter, means (18) for separating said information component from said received signals by a translating bandpass filter, means for supplying control frequency reference signals to said translating bandpass filters, means for coupling data signals to said supplying means for specifying the frequencies of signals to be provided by said supplying means, and means (38), responsive to the pilot component, for effecting forward gain correction of the information component of the received signals.

10. The receiver in accordance with claim 1 in which means (26, 27) are provided for matching the signal delay of said pilot signal component and said information signal component prior to application of said components to said gain correcting means.

11. In a single sideband radio receiver for radio signals including phase and fading distortion effects, the signals including at least an information component and a pilot component, the improvement comprising means (17) for separating said pilot signal component from the received radio signals, means separating said information component from said received signals by a translating bandpass filter, means (38), responsive to the pilot component, for effecting forward gain correction of the information component of the received signals, and means (26, 27), included in said filter, for matching the signal delay of said pilot signal component and said information signal component prior to application of said components to said gain correcting means.

12. The receiver in accordance with claim 1 in which there are provided means (36), responsive to the pilot signal component, for effecting phase correction of the information component.

13. The receiver in accordance with claim 12 in which said gain correcting means comprises means (37) for coupling said information component from an output of said phase correcting means to said gain correcting means.

14. In a single sideband radio receiver for radio signals including phase and fading distortion effects, the signals including at least an information component and a pilot component, the improvement comprising means (17) for separating said pilot signal component from the received radio signals, means (38), responsive to the pilot component, for effecting forward gain correction of the information component of the received signals, means (36), responsive to the pilot signal component, for effecting phase correction of the information component, and said separating means comprises means (19-23) for extracting from said received signals a portion of the frequency spectrum thereof including a baseband portion representing said phase and gain distortion effects with respect to said pilot component, and means (28, 29) for translating said baseband portion to a predetermined nonbaseband level in the frequency spectrum for application to control said phase and gain correction effecting means.

15. In a single sideband radio receiver for radio signals including phase and fading distortion effects, the signals including at least an information component and a pilot component, the improvement comprising means (17) for separating said pilot signal component from the received radio signals, means (38), responsive to the pilot component, for effecting forward gain correction of the information component of the received signals, means (36), responsive to the pilot signal component, for effecting phase correction of the information component, and means (26, 27) for matching the signal delay of said pilot signal component and said information signal component prior to application of said components to said phase correcting means and to said gain correcting means.

16. The receiver in accordance with claim 15 in which means (18) are provided for separating said information component from said received signals by a translating bandpass filter, and said matching means are included in said filter.

17. In a single sideband radio receiver for radio signals including phase and fading distortion effects, the signals including at least an information component and a pilot component, the improvement comprising means (17) for separating said pilot signal component from the received radio signals, means (38), responsive to the pilot component, for effecting forward gain correction of the information component of the received signals, and means (36), responsive to the pilot signal component, for effecting phase correction of the information component, said phase correcting means comprising means (36) for frequency mixing a first input including an output of said separating means with a second input including at least said information component of said received signals to remove frequency components that are common to both of said mixing inputs, said mixing means also simultaneously translating said information component to a different frequency level.

18. The receiver in accordance with claim 17 in which means are provided for limiting out amplitude modulation in said separated pilot component prior to application to said first input of said mixer.

19. The receiver in accordance with claim 17 in which said mixing means translates said information component to baseband.

20. The receiver in accordance with claim 12 in which said pilot signal separating means comprises a translating bandpass filter (17), and means (18) are provided for separating said information component from said received signals by a further translating bandpass filter.

21. The receiver in accordance with claim 20 in which there are provided means (10), independent of received signal phase, for supplying signals of predetermined frequency to control said translating bandpass filters.

22. The receiver in accordance with claim 20 in which means (26, 27) are provided in said translating bandpass filter for said information component for matching signal propagation delays for said pilot component and said information component prior to application of said such components to said phase correcting means and to said gain correcting means.

23. The receiver in accordance with claim 20 in which means are provided for supplying control frequency reference signals to said translating bandpass filters, and means are further provided for coupling data signals to said supplying means for specifying the frequencies of signals to be provided by said supplying means.

24. In a single sideband radio receiver for radio signals including phase and fading distortion effects, the signals including at least an information component and a pilot component, the improvement comprising means (17), including a first translating bandpass filter, for separating said pilot signal component from the received radio signals, means (38), responsive to the pilot component, for effecting forward gain correction of the information component of the received signals, a second translating bandpass filter (18) for separating said information component from said received signals, means (10), independent of the signal phase of said received signals, for supplying predetermined control frequency signals to said translating bandpass filters, means (36), responsive to the pilot signal component, for effecting phase correction of the information component, said phase correcting means including frequency mixing means (36) having an input coupled to the output of said second translating bandpass filter, and signal limiting means (32) for coupling an output of said first translating bandpass filter to a futher input of said frequency mixing means and stripping substantially all amplitude variations from such output to leave signal zero crossing information for application to said mixing means, and said gain correcting means comprises means (33) for detecting amplitude envelope variations in the output of said first translating bandpass filter, means (39) for coupling an output of said envelope detecting means to compensate said received signals for relatively slow signal amplitude variations therein, a gain correcting circuit (38), means for further coupling said envelope detector output to an input of said gain correcting circuit, means (37) for coupling at least one sideband of said information component in the output of said mixing means to further input of said gain correcting circuit, and means (38) for interacting signals at said inputs thereof to cancel like amplitude variations in common phase prior to applying the net corrected signal to an output of said gain correcting circuit.

25. The receiver in accordance with claim 4 in which there are provided means (36), responsive to the pilot signal component, for effecting phase correction of the information component, and means (37), including said phase correcting means, are provided for connecting said information component separating translating bandpass filter to supply said information component to said gain correcting means with said fading distortion effects in said pilot component and in said information component being in substantial time alignment in said gain correcting means.

26. The receiver in accordance with claim 4 in which means (36), responsive to the pilot signal component, are provided for effecting phase correction of the information component, and said information component separating means comprises means (46) for separating said information component from signals at an output of said gain correcting means.

27. The receiver in accordance with claim 12 in which said receiver comprises plural signal reception modules (47, 48), one of which includes said separating means for pilot component signals and further includes said phase correcting means, each other one of said modules also includes separating means and correcting means as in said one module, such phase correcting means of each of said modules including means for producing a phase corrected information component of said received signals, means (51) are provided for summing pilot component outputs of said respective reception modules, means (52) are provided for summing said phase corrected information components of said respective modules, and means (53, 56) are provided for coupling outputs of both of said summing means to said gain correcting means for cancelling signal amplitude variation components which are common to outputs of both of said summing means.

28. The receiver in accordance with any of the claims 1 or 12 in which said gain correcting means comprises means (38) for dividing at least said information signal component by the amplitude envelope of said pilot component for cancelling from the output of said correcting means amplitude variations which are common to both of said components and time aligned with one another.

29. The receiver in accordance with claim 28 in which said establishing means comprises means (35) for limiting the minimum value of said pilot component envelope prior to division into said information component to a value comprising the product of a predetermined constant times the average value of said envelope for thereby limiting the maximum output amplitude of said gain correcting means in the presence of very small amplitudes of said pilot component envelope.

30. In a single sideband radio receiver for radio signals including phase and fading distortion effects, the signals including at least an information component and a pilot component, the improvement comprising plural signal reception modules (47, 48), each including means (17) for separating said pilot signal component from the received radio signals, and means (36), responsive to the pilot component, for effecting phase correction of the information component, such phase correction means producing a phase corrected information component of said received signals, and means (52) for summing said phase corrected information components of said respective modules.

31. In a single sideband radio receiver for radio signals including phase and fading distortion effects, the receiver including nonlinear envelope detecting means (33), the signals including at least an information component and a pilot component, the improvement comprising means (17) for separating said pilot signal component from the received radio signals, means for applying the separated pilot component to said detecting means, means (38), responsive to the detected pilot component envelope, for effecting forward gain correction of the information component of the received signals, and means (26, 27) for matching the signal delay of said pilot signal component and said information signal component prior to application of said components to said gain correcting means.

32. In a single sideband receiver for radio signals including amplitude and phase fluctuations, said signals including at least an information component and a pilot component, a method for substantially reducing said phase fluctuations in said information signals and including the steps of
> frequency mixing to translate at least said pilot component to a first band and filtering that band to restrict the width thereof to substantially only said pilot component with its said phase fluctuations,
> frequency mixing said first band signals to translate them to a second band including a suppressed carrier frequency corresponding to said information component associated with a predetermined intermediate frequency band,
> amplitude limiting second band signals to remove said amplitude fluctuations, and
> frequency mixing said information component and the output of the limiting step to reduce substantially said phase fluctuations.

33. The signal fluctuation reducing method in accordance with claim 32 in which
> said pilot component frequency mixing step comprises frequency mixing at least said pilot component to baseband and filtering that band to restrict the width thereof to substantially only said pilot component with its said phase fluctuations.

34. In a single sideband radio receiver for radio signals including phase and fading distortion effects, the receiver including nonlinear envelope detecting means (33), the signals including at least an information component and a pilot component, the improvement comprising
> means (17) for separating said pilot signal component, without significant information component energy, from the received radio signals,
> means for applying the separated pilot component to said detecting means, and
> means (38), responsive to the separated pilot component envelope, for effecting forward gain correction of the information component of the received signals, said effecting means including means (38) for dividing said information signal component by the amplitude envelope of said pilot component for cancelling corresponding amplitude variations common to both of said components.

* * * * *